_United States Patent_ [19]

Goodrich et al.

[11] 3,733,923

[45] May 22, 1973

[54] ECONOMICAL AUTOMATIC BALANCER FOR ROTATING MASSES

[76] Inventors: Eugene A. Goodrich, 4101 Wedgworth Road, Fort Worth, Tex. 76133; Robert H. Johnson, P.O. Box 924, Champaign, Ill. 61820

[22] Filed: Aug. 30, 1971

[21] Appl. No.: 175,938

[52] U.S. Cl. ................. 74/573, 64/1 V, 301/5 BA, 188/1 B
[51] Int. Cl. ........................................... F16f 15/32
[58] Field of Search ........................... 74/573, 574; 301/5 BA; 188/1 B

[56] References Cited

UNITED STATES PATENTS

| | | | |
|---|---|---|---|
| 3,314,726 | 4/1967 | Rehnborg et al. | 301/5 BA |
| 331,450 | 12/1885 | Rothe | 74/573 |
| 3,378,115 | 4/1968 | Stephens | 74/574 |
| 3,408,111 | 10/1968 | Foote | 75/573 X |

Primary Examiner—Charles J. Myhre
Assistant Examiner—F. D. Shoemaker
Attorney—Wm. T. Wofford et al.

[57] ABSTRACT

An economical automatic balancer for rotating masses characterized by a circular rigid self-sustaining race formed of a precision bent metallic tube having its ends welded together and having a substantially uniform internal diameter so as to define a smooth raceway for spherical counterweights; a plurality of counterweights and a lubricating and damping fluid movably disposed within the race; and means for rigidly connecting the race with the rotating mass such that the spherical counterweights will align themselves within the race so as to compensate for dynamic unbalance thereof. The use of the precision bent metallic tube effects an automatic balancer that is advantageous over similar prior art balancers, is easily installed in a wide variety of applications, yet is much more economical in its total cost than the prior art balancers.

3 Claims, 3 Drawing Figures

PATENTED MAY 22 1973  3,733,923

INVENTORS
Eugene A. Goodrich
Robert H. Johnson
BY
Wofford Felsman & Fails
ATTORNEYS

ECONOMICAL AUTOMATIC BALANCER FOR ROTATING MASSES

BACKGROUND OF THE INVENTION

1. Field of the Invention

This invention relates to automatic balancers for damping vibrations in rotating masses; such as, rotors in jet engines, grinders, helicopter rotors, propellors, fans, shafts. More particularly, the automatic balancer is of the type having a plurality of spherical counterweights, or ball weights, in a race rotating about an axis.

2. Description of the Prior Art

Heretofore balancers of the referenced type were not effective at high speeds because they were not precisely made. In a copending application Ser. No. 139,758, filed May 3, 1971, we have described and claimed a precisely engineered and precision made automatic balancer to correct for the prior art difficulties. There are many applications, however, where a less precisely made balancer, that would still obviate the disadvantages of the prior art structures, would be useful. For example, dynamic wheel balancers are described in U.S. Pat. Nos. 3,164,413 and 3,316,021. In these patents, as in the prior art devices, the circular races were not self-sustaining, but were of plastic intended to conform with the circular recesses within which they were emplaced. These recesses were not designed for precision control of such balancing spherical counterweights; the races did not correct any imperfections in these recesses; and the counterweights, or balls, tended to bunch and create worse vibrations than those corrected at lower speeds.

Accordingly, it is a primary object of this invention to provide an automatic balancer of the race and spherical counterweight type that is capable of balancing masses at all rotational velocities, yet be economical enough for widespread use.

It is also an object of this invention to provide a race and spherical counterweight type of balancer capable of employing relatively large counterweights to compensate for greater dynamic unbalance; yet provide, in specific embodiments, means for first joining the tube and then adding the counterweights and then the damping fluid for less expensive fabrication.

These and other objects will become apparent from the following descriptive matter and the accompanying drawings.

DESCRIPTION OF PREFERRED EMBODIMENTS

Figure 1:
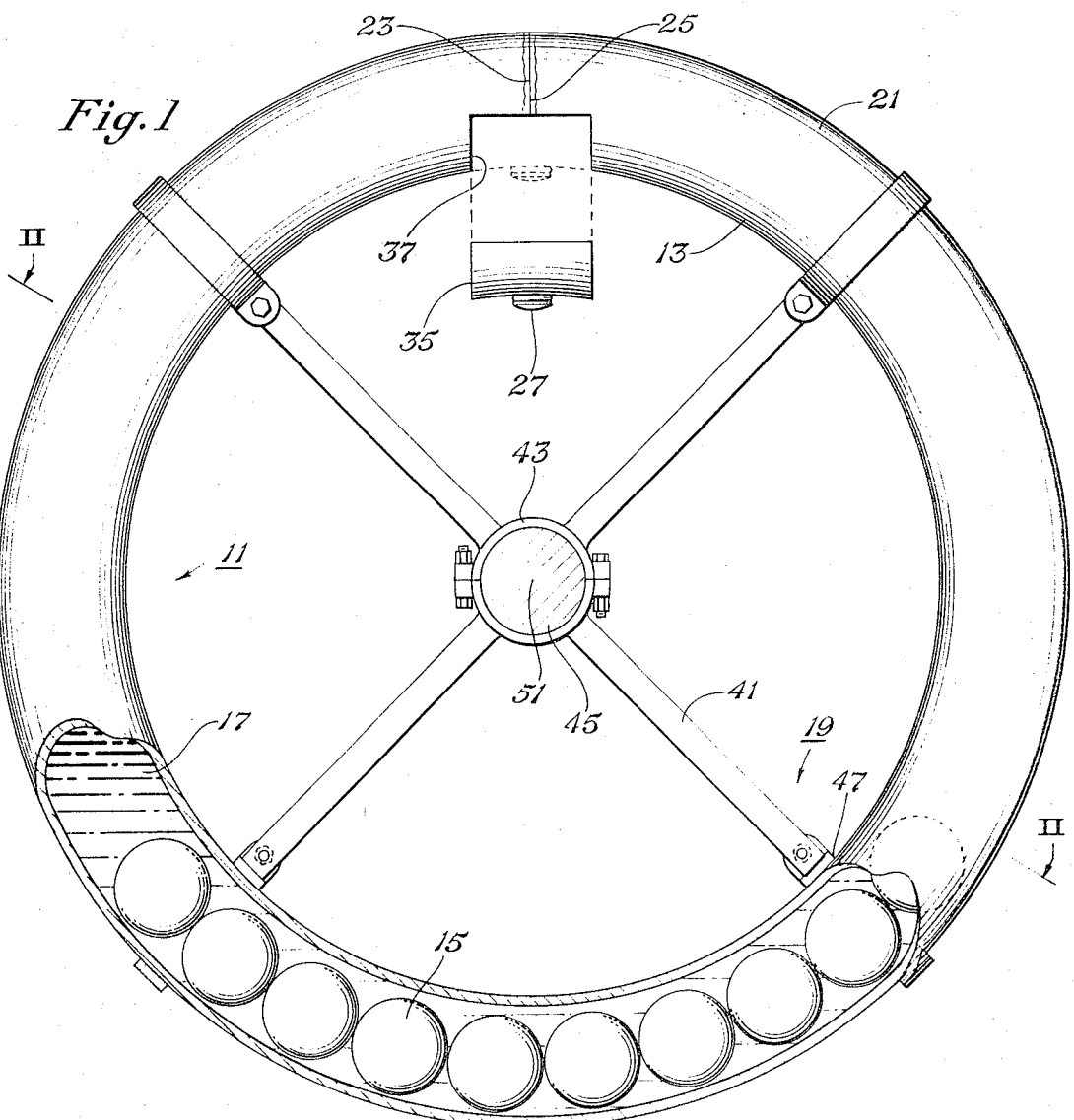
FIG. 1 is a side elevational view, partly cutaway, of one embodiment of this invention.
Figure 2:
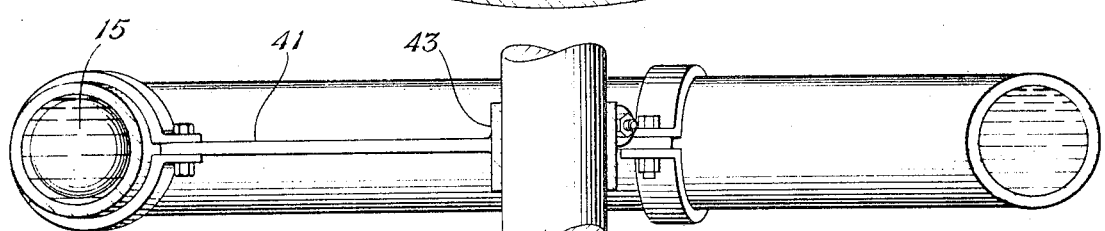
FIG. 2 is a side cross sectional view taken along the lines II — II of FIG. 1.

Referring to FIG. 1, the device 11 for automatically balancing a rotating mass comprises the major elements or subassemblies of a race 13, a plurality of spherical counterweights 15, lubricating and damping fluid 17, and means 19 for connecting the race 13 with the rotating mass.

The race 13 comprises an endless circular rigid self-sustaining race that consists essentially of a precision bent metallic tube 21 having its ends 23 and 25 welded together and the excess metal removed. The metallic tube 21 must have at least one wall that has an internal surface that is free of seams, protuberances, depressions and the like that will intefere with free movement of spherical counterweights; and must be precisely bendable such that the wall defines an outer circumferential wall of the race. For example, linearly welded tubing may be employed as long as the welded seam is on the internal wall of the race so that it does not interfere with free movement and positioning of the spherical counterweights. We have found that a preferred embodiment of this invention comprises employing seamless metallic tubing to alleviate problems otherwise encountered. In view of the economical and practical difficulties which have been encountered over the years in this crowded art, it was surprising to us that the economical metallic tubes; such as, formed by conventionally extruded seamless metallic tubing; would have a sufficiently uniform internal diameter so as to define a raceway that was smooth enough for proper alignment of the spherical counterweights, in the damping and lubricating fluid, to effect the desired compensation for dynamic unbalance of a rotating mass. Moreover, the economy which can be effected by bending the metallic tube into a circular raceway allows providing automatic balancers for balancing rotating masses which have been economically infeasible to balance heretofore. The metallic tube 21 is a tubing of metal such as aluminum or steel that can be bent to the desired shape and that has sufficient rigidity to be self-supporting and self-sustaining without yielding to the centrifugal force of one or more of the counterweights 15. Moreover, the metallic tubing is sufficiently rigid to resist deformation under discontinuities and imperfections of a means for connecting it with the rotating mass.

The plurality of spherical counterweights 15 comprise a plurality of ball weights that have a diameter less than the internal diameter of the metallic tube 21. Each spherical counterweight is as nearly perfect in shape and is as uniform in density as practical. Each counterweight is at least as resistant to deformation as the metal of the metallic tube 21, and preferably has a hardness as great as that of stainless steel. We have found that chrome plated or carbon steel balls are satisfactory. The spherical counterweights 15 are free to move in the circular race 13. The spherical counterweights 15, when adjacent each other, extend for a distance in the range of from about one-eighth to about one-half of the circumference of race 13.

Figure 3:
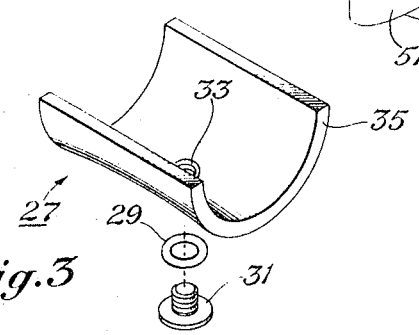
FIG. 3 is an isometric view of the cap and filler plug assembly of the embodiment of FIG. 1.

The lubricating and damping fluid 17 may comprise any of the non-corrosive fluids; such as, liquid silicone; that will lubricate the surfaces to minimize friction yet have sufficient viscosity to damp transitory and undesirable movement of the counterweights 15 in race 13. For example, the interior passageway of the race 13 containing the counterweights 15 is filled up to about two-thirds full of the liquid silicone so that it has the desired lubricating and damping effect on movement of the spherical counterweights 15. The lubricating and damping fluid 17 is introduced through the filter plug assembly 27. As illustrated in FIG. 3, the filler plug assembly 27 comprises an o-ring seal 29 suitably emplaced intermediate a plug 31 and the mating threaded aperture 33 into which the plug 31 threadedly and sealingly fits. As illustrated, the filler plug assembly 27 is emplaced in cap 35.

Preferably, the ends 23 and 25 of the seamless metallic tubing are welded together and an aperture 37 thereafter formed for insertion of the spherical counterweights 15. This enables obtaining a nearly perfect joinder of the ends 23 and 25 and facilitates machining, milling, or the like, of the welded portion of metal to the desired interior finish before the spherical counterweights are inserted within the race 13. Thus, the cost can be kept low because the rate of rejection is kept low. For example, any rejects do not reject the spherical counterweights which otherwise would have been previously inserted into the ends of the metallic tube 21 before they were welded together. We have found that the aperture 37 is readily and economically formed by a grinding stone or an end mill, affording appropriate dimensions for insertion of the spherical counterweights 15, yet allowing nearly perfect joint formation with the edges of the cap 35.

After formation of the aperture, finishing of the interior surface and the adding of the counterweights 15 and the fluid 17; the cap 35, with or without the filler plug assembly 27, is emplaced in the aperture 37 and welded into place so as to present minimal interference on the interior surface of the race 13. The cap 35 is placed on the inner circumferencial surface, or inner wall, of the race 13 such that any imperfections in finish effected by the welding of the cap 35 into place will not interfere with free movement of the spherical counterweights 15 rolling against the outer wall of race 13. Expressed otherwise, the spherical counterweights 15 roll along the outer wall to effect the requisite distribution for countering dynamic unbalance and do not encounter the slight imperfections effected by the insertion and welding into place of the cap 35 on the inner wall.

The means for connecting the rigid self-sustaining race 13 with the rotating mass such that the spherical counterweights will align themselves so as to compensate for dynamic unbalance is illustrated as a plurality of struts 41 connected via an annular collar 43 with shaft 45, as representative of the rotating mass. The struts 41 are also connected via ring clamps 47 with the race 13. The device 11 may be mounted directly to the rotating mass, if desired; instead of being mounted to the shaft 45. For example, it may be mounted directly to the rotating mass by way of metal clips or it may be adhered as by being welded or cemented in place. In any event, the device 11 is rigidly connected with the rotating mass to ensure proper dynamic balancing. Preferably, it is mounted with metal-to-metal contact so as to prevent any vibrational movement without effecting the desired redistribution of the spherical counterweights 15.

In operation, the metallic tubing is cut to the requisite length to form metallic tube 21 which is engineeringly precision bent to form a circle and emplace the ends 23 and 25 adjacent each other. The ends 23 and 25 are welded as indicated hereinbefore, and the interior surface of the well finished to form as nearly a perfect finish as desired through the aperture 37, which is formed in the inner wall of the race 13. The desired number of spherical counterweights 15 are emplaced in the race 13, as is the lubricating and damping fluid 17. Thereafter, the cap 35 is welded into place and the plug 31 and o-ring 29 of the filler plug assembly 27 is inserted. The resulting device 11 is attached, via the means for connection 19, with the rotating mass, illustrated by shaft 45. Thereafter, as the rotation is begun, the spherical counterweights 15 are positioned by the centrifugal force on the balls until the center of the system, illustrated by the center 51 of shaft 45, is the same as the center of rotation of the rotating mass and the device 11. The minor dynamic imbalance induced by the cap 35, or by filler plug assembly 27, wherever it is emplaced in the inner wall of the race 13, are readily compensated for by distribution of the spherical masses 15. As is well known, force components of the centrifugal and centripetal forces act on the respective spherical counterweights 15 to move them about the race 13 until they oppose the unbalanced mass and create a balancing force opposing the force of the unbalance.

Our work in this field for several years has indicated to us that these devices, when perfected, are effective to compensate for dynamic unbalance up to the limit of the massing of the balls opposite the unbalanced weight. We have found that we are able to employ relatively large diameter tubing 21 and consequently, relatively large diameter spherical counterweights 15, to enable compensating for larger dynamic forces than have been heretofore practical. For example, we have found that we can employ 1 ¼ inch metallic tubing and 1 inch diameter spherical counterweights 15 to balance large and relatively crude objects such as large fans and the like that have been heretofore impractical and economically infeasible to balance.

Although the forms of the invention illustrated in the drawings are in the vertical positions, the device 11 is operative at any angle at which it may be desirable to mount it. As illustrated, the automatic balancer is mounted concentrically about the center of rotation of the mass and turns about the axial center of the rotating mass to be balanced.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A device for automatically balancing a rotating mass comprising:
   a. an endless circular rigid self-sustaining race consisting essentially of a precision bent metallic tube having its ends welded together, said metallic tube having a substantially uniform internal diameter and having a smooth internal surface along the exterior circumferential wall so as to define a smooth raceway for spherical counterweights;
   b. a plurality of spherical counterweights disposed within said rigid self-sustaining race, said spherical counterweights being formed of a metal that is at least as resistant to deformation as the metal of said metallic tube; said spherical counterweights having a diameter less than the diameter of said metallic tube so as to be movable within said metallic tube;
   c. a lubricating and damping fluid disposed within said rigid self-sustaining race for lubricating and damping movement of said spherical counterweights;
   d. an aperture disposed in the radially interior wall of said rigid self-sustaining race adjacent the welded together ends; said aperture being large enough to allow insertion of said spherical counterweights and to allow smoothly finishing the weld formed where the ends are welded together for an economical smooth internal surface at said weld to prevent imperfections that would effect stacking up of the balls and creating an imbalanced condition;

e. a cap that is sealingly fitted within said aperture after said weld has been smoothly finished on the interior of said circular rigid self-sustaining race and said spherical counterweights and said lubricating and damping fluid have been inserted thereinto; and f. means for connecting said rigid self-sustaining race with said rotating mass such that said spherical counterweights will align themselves within said race so as to compensate for dynamic unbalance of said rotating mass.

2. The device of claim 1 wherein said cap has a filler plug assembly for adding said lubricating and damping fluid to the interior of said race.

3. The device of claim 1 wherein said metallic tube comprises seamless metallic tubing.

* * * * *